Dec. 15, 1953     R. C. KESTER     2,662,236
WHEEL SUSPENSION ASSEMBLY FOR BOATS
Filed Sept. 9, 1950                        2 Sheets-Sheet 1

RALPH C. KESTER

Inventor

Hubert Miller

Attorney

Dec. 15, 1953 R. C. KESTER 2,662,236
WHEEL SUSPENSION ASSEMBLY FOR BOATS
Filed Sept. 9, 1950 2 Sheets-Sheet 2

RALPH C. KESTER
Inventor

Hubert Miller
Attorney

UNITED STATES PATENT OFFICE 2,662,236

WHEEL SUSPENSION ASSEMBLY FOR BOATS

Ralph C. Kester, Wichita, Kans.

Application September 9, 1950, Serial No. 183,957

4 Claims. (Cl. 9—1)

This invention relates to a mechanical assembly for converting a boat into a trailer which may be pulled from place to place by car or other road vehicle.

It is the chief object of the invention to provide an assembly of this type which not only includes wheel units which can be easily attached to and removed from the boat hull, but one in which each wheel unit includes a means for absorbing road shocks and for snubbing rebound shocks.

It is another object of the invention to provide a removable wheel unit which includes an inherently resilient torsion element for absorbing shocks and rebounds.

It is another object to provide an assembly of this type which will not impair the normal function and operation of the boat when the wheel units are removed.

An additional object is to provide a novel means for removably securing a wheel unit to a boat hull.

The invention, together with other objects attending its production, will be more clearly understood when the following description is read in connection with the accompanying drawings, in which.

Figure 5:
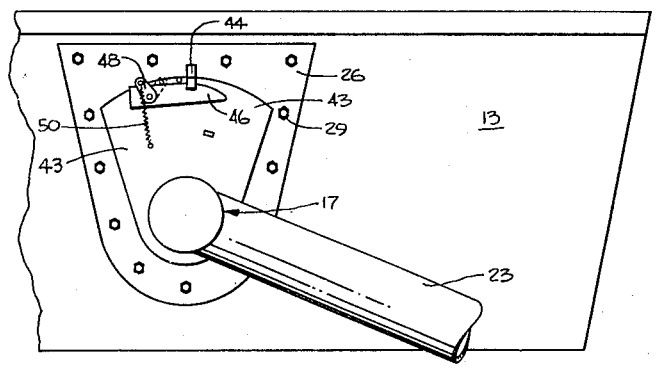
Figure 6:
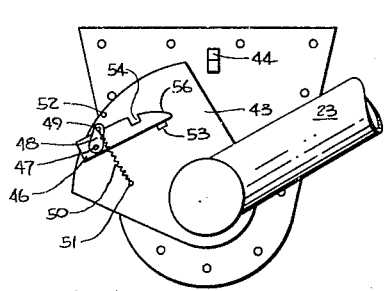
Figure 7:
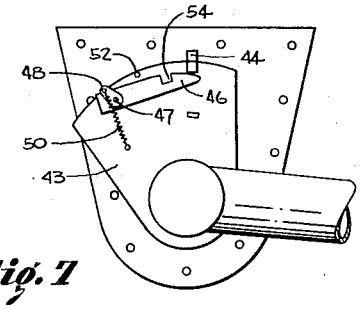
Figure 8:
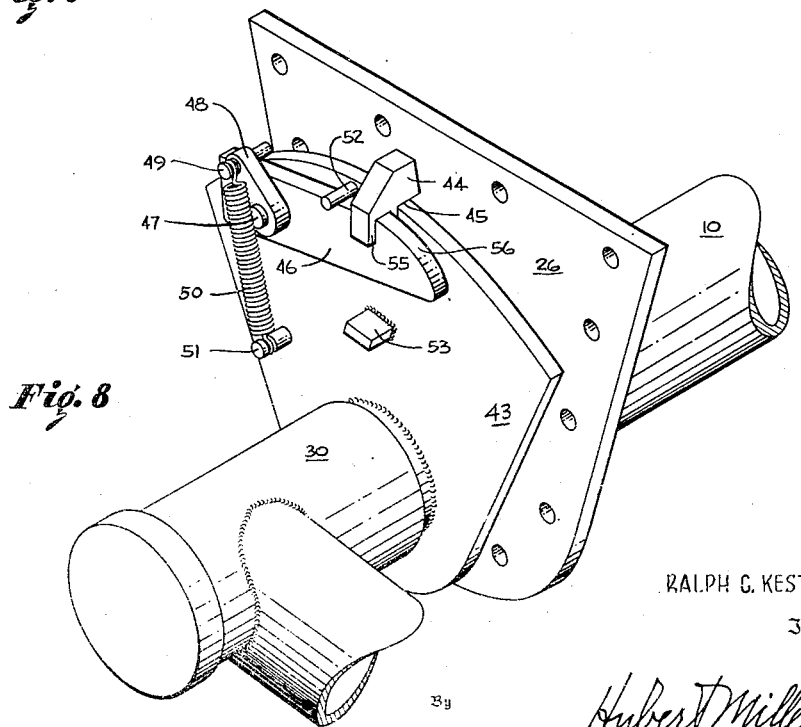

Figs. 5, 6, and 7 are similar side views of a portion of the invention showing the relative positions of certain of the parts during various stages of their operation; and Fig. 8 is an enlarged fragmentary perspective view of the invention showing details of construction.

General description

Figure 1:
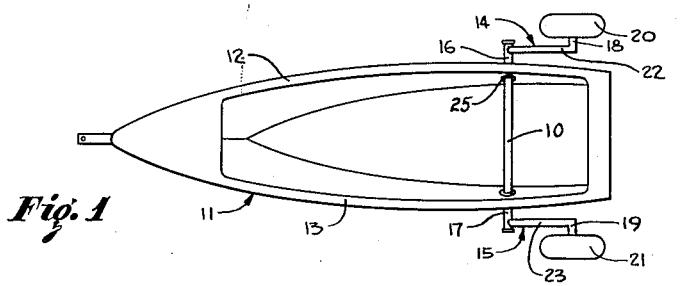
Fig. 1 is a plan view of a boat equipped with my invention.
Figure 2:
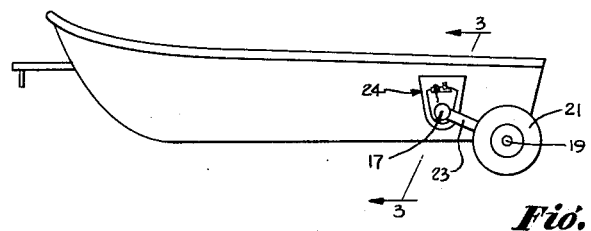
Fig. 2 is a side elevation of same.

As will be seen from Figs. 1 and 2, the invention generally includes a rigid tubular housing 10 mounted transversely in the hull of a boat 11, the opposite ends of the tube being rigidly secured to the side walls 12 and 13 of the boat hull. A pair of wheel units 14 and 15, include rigid cranks which have their respective pins 16 and 17 secured in an end of the tube 10. The crank axles 18 and 19 journal wheels 20 and 21. The crank webs 22 and 23 are substantially parallel, and lie in a common plane extending downwardly and rearwardly from the tube 10. In this invention the crank pins 16 and 17, include flexible torsion elements which will be herein described. A latch assembly 24 is provided to lock the pins 16 and 17 against end play in the tube 10, and to lock the inner ends of the torsion elements against rotation while permitting torsional movement of the outer ends thereof as a result of road shocks transmitted through the wheels and through the crank webs 22 and 23, the torsion elements being adapted to absorb such shocks.

Construction details

It will be understood by the reader that the wheel units, including the cranks 14 and 15, are identical save that one is right hand and one left hand. Consequently it will be necessary to describe only one of the units and its latch assembly 24.

Figure 3:
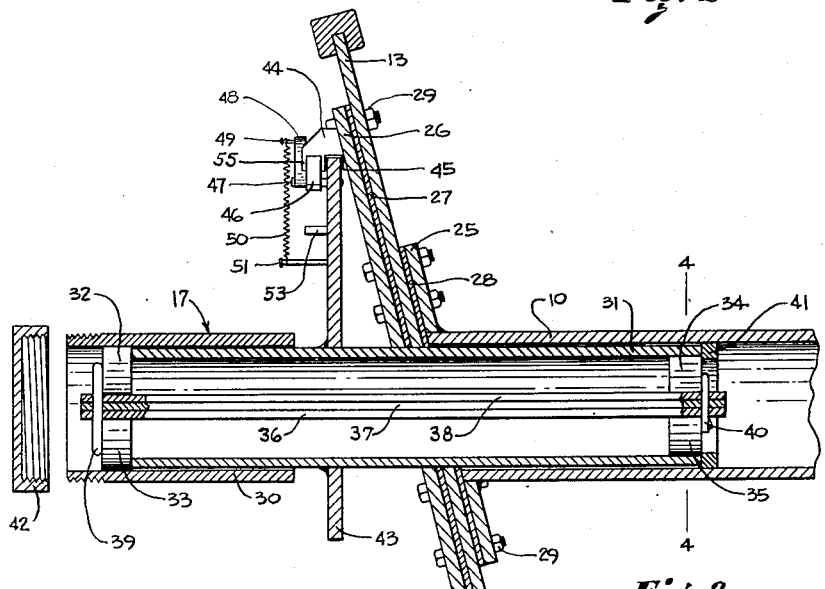
Fig. 3 is a lateral sectional view along the line 3—3 of Fig. 2, and shows details of construction of my invention.

As will be seen from Fig. 3, each end of the housing 10 is fitted with a plate 25 which is properly contoured and welded thereon at an angle to fit the interior surface of the boat side wall 13. A larger exterior plate 26 is complementally contoured to fit the exterior surface of the boat side wall. Sealing gaskets 27 and 28 are placed between the respective plates and the boat side wall, and the plates are clamped tightly against the side wall by means of a plurality of bolts 29. Apertures are provided in the side wall of the boat and in the plate 26 in alignment with the bore of the tube 10. The tube 10 is preferably located above the normal loaded water line of the boat. Thus the housing 10 is rigidly mounted in the boat with its ends open to receive the pins 16 and 17 of the cranks 14 and 15.

Figure 4:
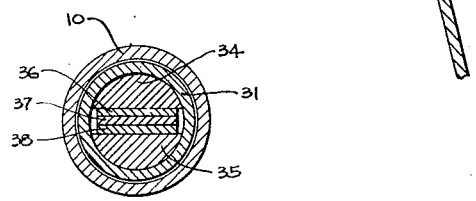
Fig. 4 is a sectional view taken along the line 4—4 of Fig. 3.

The pins 16 and 17 each includes two telescoped tubes 30 and 31. Near its outer end, each of these tubes has welded therein a pair of substantially semi-circular heavy lugs 32, 33 and 34, 35 respectively. The straight edges of each lug are arranged parallel, as shown in Fig. 4, and are spaced apart sufficient to receive a torsion element, shown as a plurality of superposed flat leaf springs 36, 37 and 38. Substantially rectangular seats are thus formed in the outer end of each of the tubes 30 and 31 to receive and hold the opposite ends of the springs. The respective ends of the leaf springs are provided with aligned apertures for receiving cross pins 39 and 40, which bear against the exterior surfaces of the lugs 32—35 and thus prevent relative outward movement of the two tubes. Relative inward movement of the tubes is prevented by the contact of the outer end of the tube 31 with the inner sides of the lugs 32—33. Inward movement of the entire pin assembly is limited by the contact of the opposite end of tube 31 against a metal ring 41, which is welded inside the housing 10 in the proper location. A cap 42 is provided to close the outer end of the tube 30.

It will be understood that the upper end of the web 23 is welded substantially normal to the exterior surface of the outside tube 30, and that a road shock transmitted from the wheel 21 to the web 23 will tend to rotate the tube 30 and the adjacent end of the torsion element 36—37—38. It is evident, then, that if the opposite end of the torsion element is held against rotation, the shock will be absorbed by the twisting and spring back of the resilient torsion element. The inner end of the torsion element is held against rotation simply by locking the tube 31 against rotation in the housing 10. Such locking means will now be described.

A heavy substantially sector shaped plate 43 is welded to the exterior surface of the tube 31 in a plane normal thereto. The spacing of the plate from the outer end of the tube 31 is such that when that end of the tube is in contact with the ring 41, the upper arcuate surface of the plate will lie immediately adjacent the fixed plate 26, as clearly shown in Fig. 3. A heavy lug 44 is welded to the outer surface of the plate 26, and is provided with a notch 45 in its lower surface for receiving the arcuate upper edge of the plate 43 when the plate is rotated with its pin to the proper position. The overhanging portion of the lug 44 thus prevents outward movement of the described pin assembly. If the pin assembly and plate are rotated to the positions shown in Fig. 6, however, the assembly can be easily removed from the housing 10.

As a means of locking the plate 43, and consequently the tube 31 against rotation, a latch 46 is pivotally mounted on the plate 43 by means of a stud 47. This same stud pivotally mounts one end of a trigger 48, the opposite end of which rigidly carries a pin 49 which projects from both side surfaces of the trigger. The inwardly projecting end of pin 49 serves as a stop to limit the pivotal movement of the trigger 48 with relation to the latch 46, as can be clearly seen in Fig. 8. The outer end of this pin 49 holds one end of a tension spring 50, the other end of which is held by a pin 51 which is mounted on the plate 43. This spring 50, due to the positioning of the pin 51, is capable of holding the trigger either in the position shown in Figs. 5 and 7, or in the position shown in Fig. 6, once the trigger has been manually moved to either of these positions.

The pivotal movement of the latch 46 is limited by the stops 52 and 53, also mounted on and projecting outwardly from the plate 43. When the trigger 48 is moved to the position shown in Fig. 7 the opposite ends of the spring 50 are both on the left hand side of the latch pivot point 47, and the spring tension thus urges the latch in a counterclockwise direction against the stop 52. When the upper end of the trigger is moved to the position shown in Fig. 6, the spring urges the latch to move in a clockwise direction until its lower edge contacts the stop 53.

That end of the latch 46 opposite its pivot point is provided with a notch 54 shaped to receive the lowermost or overhanging portion 55 (Fig. 8) of the lug 44. The upper surface of the extreme outer end of the latch 46 is beveled or arcuately shaped, as indicated at 56. This arcuate surface 56 is adapted to contact the lug portion 55 and to pivot the latch 46 clockwise slightly as the entire latch assembly is moved clockwise from the Fig. 7 to the Fig. 5 position, thus automatically seating the lug 55 in the notch 54, which in turn locks the plate 43 and the tube 31 against rotation.

*Operation*

With both wheel units 14 and 15 in the position indicated in Figure 6, the pin of each unit can be moved axially into its respective end of the tubular housing 10. The operator manually moves the triggers 48 from the position shown in Figure 6 to the position shown in Figure 7. When each pin has been moved axially into its end of the housing until the ring 41 is contacted, the wheel end of the unit is lowered and the edge of the plate 43 enters the notch 45. It will be understood that at this time the boat is resting on a dock or on the beach. Naturally the tires 20 and 21 will contact the surface on which the boat is resting and will temporarily prevent further clockwise movement of the wheel units about their respective crank pins 16 and 17. The operator then walks to the rear of the boat and simply lifts that end vertically. As he does so, the weight of the wheels 20 and 21 causes an additional clockwise movement of the plate 43 and its latch assembly. The latch 46 is thus forced beneath the lower edge of the lug 44 until the lug seats in the notch 54, at which time the operator releases the boat and its weight is assumed by the wheel units.

With both wheel units locked in position, as shown in Figure 5, they can be removed easily as follows: it is only necessary for the operator to move the triggers 48 from the position shown in Figure 5 to the position shown in Figure 6. He then walks to the rear end of the boat and lifts that end slightly, thus releasing the forces urging the side edge of the notch 54 against the side surface of the lug portion 55. When this force is removed, the tension of spring 50 immediately moves the latch 46 into the position shown in Figure 6. With the latch in this position, the wheel assembly is free to turn about its crank pin 16 or 17. The operator then simply lowers the boat to the surface on which he is standing. During this lowering of the boat, the plate 43 moves from the position shown in Figure 5 through the position shown in Figure 7. He then manually lifts each outer end of each wheel unit to the position shown in Figure 6, the arcuate end of the plate 43 thus being freed from the lug 44, the unit can then be pulled outward from its seat in the end of the housing 10.

From the above description, it will be clearly seen that I have produced a wheel assembly for boats which fulfills the objects set out above. The assembly is operable by a single person, due to its automatic latching and unlatching features as above described. When the two wheel units are firmly latched in position on the boat and the boat is being drawn along a highway or road surface, the respective torsion elements, 36—37—38, absorb all road shocks transmitted from the wheels through the crank webs to the respective tubes 30. These torsion elements also serve to snub rebound shock, as will be clearly understood.

Having described the invention with sufficient clarity to enable those familiar with this art to construct and use it, I claim:

1. A wheel suspension assembly for a boat comprising: a crank which includes a pin, a web, an axle, and a wheel on the axle, said pin including two telescoped tubes the first of which is connected rigidly to one end of said web, and the second of which is oscillatable with relation to the first tube; a fixed length inherently resilient torsion element housed within said tubes and having its ends rigidly connected to the respective outer ends of the two mentioned tubes; a rigid plate rigidly secured to and extending outwardly from said second tube intermediate its ends; a pin receiving socket adapted to be mounted rigidly in a side wall of a boat for complementally receiving a portion of said second tube; a keeper lug adapted to be rigidly mounted on the exterior surface of said side wall of the boat to receive and hold a portion of the outer edge of said plate; and a spring pressed latch pivotally mounted on the plate contacting and cooperating with said keeper lug to prevent planar movement of the plate and rotational movement of said second tube.

2. A wheel suspension assembly for a boat comprising: a crank which includes a pin, a web, an axle, and a wheel on the axle, said pin including two telescoped tubes the first of which is connected rigidly to one end of said web, and the second of which is oscillatable with relation to the first tube; a fixed length inherently resilient torsion element housed within said tubes and having its ends rigidly connected to the respective outer ends of the two mentioned tubes; a rigid plate rigidly secured to and extending outwardly from said second tube intermediate its ends; a pin receiving socket adapted to be mounted rigidly in a side wall of a boat for complementally receiving a portion of said second tube; a keeper lug adapted to be rigidly mounted on the exterior surface of said side wall of the boat receiving and holding a portion of the outer edge of said plate; a latch pivotally mounted on the plate contacting and cooperating with said keeper lug to prevent planar movement of said plate and rotational movement of said second tube; means fixed on said plate to limit the pivotal movement of said latch in both directions; and spring means connected to said plate and to said latch for selectively urging the latch toward and away from a keeper lug engaging position.

3. In combination, a boat and a wheel suspension assembly therefor, comprising a boat having a transverse tube rigidly attached thereto; a crank which includes a pin, a web, an axle, and a wheel on the axle, said pin including two telescoped tubes the first of which is connected rigidly to one end of said web, and the second of which is oscillatable with relation to the first tube, said tubes inserted into said boat carried transverse tube; a fixed length inherently resilient torsion element housed within said tubes and having its ends rigidly connected to the respective outer ends of the two mentioned tubes; a rigid plate rigidly secured to and extending outwardly from said second tube intermediate its ends; a pin receiving socket fixed in a side wall of the boat complementally receiving a portion of said second tube; a keeper lug rigidly mounted on the exterior surface of said side wall of the boat receiving and holding a portion of the outer edge of said plate; a latch pivotally mounted on the plate contacting and cooperating with said keeper lug to prevent planar movement of said plate and rotational movement of said second tube; means fixed on said plate to limit the pivotal movement of said latch in both directions; and spring means connected to said plate and to said latch for selectively urging the latch toward and away from a keeper lug engaging position.

4. A wheel suspension assembly for detachable association with a body to be transported, comprising: a rigid tubular socket carrying a radially extending plate to facilitate the mounting of the socket transversely and non-rotatably in the body; a crank which includes a pin, a web radially disposed with relation thereto, an axle disposed parallel to the pin, and a wheel on the axle, said pin including two telescoped relatively oscillatable tubes, one of which is rigidly secured to that end of the web opposite said axle, and the other of which is web-free; an elongated torsion spring housed in said tubes and having its opposite ends rigidly secured to the respective tubes, said socket being adapted to telescopically receive the web-free tube of said pin; a rigid member rigidly secured to said web-free tube and extending radially outward therefrom; a lug secured to said radially extending plate and engageable with said rigid member to lock the web-free tube against longitudinal movement in the socket; and means mounted on said rigid member and releasably engaging said lug to lock the web-free tube against rotation in said socket.

RALPH C. KESTER.

References Cited in the file of this patent
UNITED STATES PATENTS

| Number | Name | Date |
|---|---|---|
| 1,946,497 | Little | Feb. 13, 1934 |
| 2,194,964 | Wilson | Mar. 26, 1940 |
| 2,297,465 | Froechlich | Sept. 29, 1942 |
| 2,497,072 | Cooper | Feb. 14, 1950 |
| 2,515,564 | Mercer et al. | July 18, 1950 |